(12) United States Patent
Pezeshki et al.

(10) Patent No.: US 10,178,452 B2
(45) Date of Patent: *Jan. 8, 2019

(54) OPTICAL INTERCONNECT HAVING OPTICAL SPLITTERS AND MODULATORS INTEGRATED ON SAME CHIP

(71) Applicant: Kaiam Corp., Newark, CA (US)

(72) Inventors: Bardia Pezeshki, Menlo Park, CA (US); John Heanue, Boston, MA (US); Lucas Soldano, Milan (IT); Charles Amsden, Fremont, CA (US)

(73) Assignee: Kaiam Corp., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,330

(22) Filed: Mar. 21, 2017

(65) Prior Publication Data

US 2017/0272845 A1    Sep. 21, 2017

Related U.S. Application Data

(60) Provisional application No. 62/311,302, filed on Mar. 21, 2016.

(51) Int. Cl.
*H04J 14/00*    (2006.01)
*H04Q 11/00*    (2006.01)
*H04B 10/50*    (2013.01)
*H04B 10/516*   (2013.01)

(52) U.S. Cl.
CPC ....... *H04Q 11/0005* (2013.01); *H04B 10/503* (2013.01); *H04B 10/516* (2013.01); *H04Q 2011/0007* (2013.01)

(58) Field of Classification Search
CPC .... H04J 14/02; H04J 14/0212; H04J 14/0267; H04Q 11/0003; H04Q 11/0005; H04B 10/503; H04B 10/516; H04B 10/564; H04B 10/40; G02B 6/4249; G02B 6/4274; G02B 6/4269
USPC ........ 398/45, 48, 49, 50, 51, 53, 56, 57, 79, 398/183, 188, 186, 187, 192, 193, 194, 398/158, 159, 135, 136, 72, 68, 46, 47, 398/54, 3, 5; 385/24, 37, 16, 17, 18, 14, 385/15, 89, 90, 92, 93
See application file for complete search history.

(56) References Cited

U.S. PATENT DOCUMENTS

| | | | |
|---|---|---|---|
| 7,088,891 B2 * | 8/2006 | Jung | G02B 6/125 385/15 |
| 2004/0184710 A1 | 9/2004 | Kubby et al. | |
| 2005/0025419 A1 | 2/2005 | Fish et al. | |
| 2007/0147835 A1 * | 6/2007 | Kim | H04J 14/0226 398/71 |
| 2010/0142964 A1 | 6/2010 | Chang et al. | |

(Continued)

OTHER PUBLICATIONS

International Search Report on related PCT Application No. PCT/US2017/023429 from International Searching Authority (KIPO) dated Jul. 20, 2017.

(Continued)

*Primary Examiner* — Hanh Phan
(74) *Attorney, Agent, or Firm* — Klein, O'Neill & Singh, LLP

(57) ABSTRACT

A switch module includes a switch integrated circuit (IC), an InP chip, and a planar lightwave circuit (PLC). The InP chip may include a plurality of light sources, an optical splitter, and a plurality of modulators.

16 Claims, 17 Drawing Sheets

(56) References Cited

U.S. PATENT DOCUMENTS

| | | | | |
|---|---|---|---|---|
| 2013/0022352 A1* | 1/2013 | Yamashita | .......... | H04J 14/0212 |
| | | | | 398/34 |
| 2013/0315269 A1 | 11/2013 | Liu et al. | | |
| 2014/0356001 A1 | 12/2014 | Barton et al. | | |
| 2015/0050020 A1* | 2/2015 | Tanaka | ................ | H04J 14/0282 |
| | | | | 398/65 |
| 2015/0318952 A1* | 11/2015 | Butrie | .................... | H04J 14/06 |
| | | | | 398/65 |
| 2016/0381442 A1* | 12/2016 | Heanue | ............. | H04Q 11/0005 |
| | | | | 398/45 |

OTHER PUBLICATIONS

Written Opinion on related PCT Application No. PCT/US2017/023429 from International Searching Authority (KIPO) dated Jul. 20, 2017.

\* cited by examiner

OPTICAL INTERCONNECT HAVING OPTICAL SPLITTERS AND MODULATORS INTEGRATED ON SAME CHIP

CROSS REFERENCE TO RELATED APPLICATION

This application claims the benefit of the filing date of U.S. Provisional Patent Application No. 62/311,302, filed on Mar. 21, 2016, the disclosure of which is incorporated by reference herein.

BACKGROUND OF THE INVENTION

The present application relates generally to fiber optic communications and more particularly to switching devices having fiber optic connections.

Much of our cloud based infrastructure is based on storage and processing of data by large numbers of servers in data centers. These servers are connected through a switch network in various configurations. A typical topology might be large groups of 96 servers in a rack connected to a top of rack (TOR) switch. These TOR switches are connected to an aggregation or leaf switch, which in turn is connected to a spine switch. The spine switches are interconnected to form a huge network where every server can connect with every other up and down various links in the system. Generally, with current technology, the servers are connected to the top of rack switch with 10 Gb/s Ethernet copper links, while the spine switches are connected to each other with 40 Gb/s or 100 Gb/s fiber optics. As datacenters are becoming larger and speeds are increasing, there is a trend in interconnects from active optical cable and multimode fiber to single mode fiber that has higher performance.

The switch modules themselves are relatively simple in principle. At their core there is one or more high speed switch ICs that move packets of data based on their address from one lane to another. The latest generation high performance switch ICs may have 128 lanes of 25 Gb/s in each lane, composing 3.2 Tb of data flowing in and out of a central switch IC. Data enters and exits the switch modules through a front panel via optical transceivers, with typically each fiber carrying 40 Gb/s or 100 Gb/s in 4 wavelength lanes of 4×10 Gb/s or 4×25 Gb/s. These transceivers generate or receive optical signals, and, especially those running at higher speeds, may include clock and data recovery (CDR) circuits that regenerate the signals. The transceivers are connected to the central switch IC using electrical links that are routed on a main board and up into an electronics package of the switch IC. Since high speed signals degrade rapidly during only a few inches of travel, CDRs may be used repeatedly in electrical interconnects. The switch chip itself generally includes CDRs as well. Moreover, the CDRs may also require use of equalization circuits to provide signal conditioning prior to clock and/or data recovery. Given the large number of lanes, the interconnect density and power consumption of the module can be a bottleneck to the system.

FIG. 1B shows a front 155 of a switch enclosure. The switch enclosure will generally include a switch IC, generally in a large heatsink. Power consumption can be around 200 W for this IC, so it generally requires a large heatsink and good airflow. The switch enclosure generally also includes power supplies and fans for cooling. As may be seen in FIG. 1B, the front panel is covered almost entirely with sockets 151a-n for optical transceivers, and may also include sockets 153 for other purposes. The cost of the optical transceivers can be substantial and sometimes even more costly than the switch. Switch vendors are typically gated by front panel density of these transceivers, and depending on whether the switch is used for top-of-rack, leaf, or spine, the number of ports can be anywhere from a few to hundreds. Note that the front panel of the switch module is covered entirely with transceivers.

As the switch ICs improve in performance, the switch modules are even more constrained by the constraints of the architecture. Current switch ICs with 128 lanes of 25 Gb/s may double to 256 lanes of 25 Gb/s, that may in turn double to 256 lanes of 50 Gb/s, presumably each 50 Gb/s lane actually running at 25 Gigabauds but using advanced PAM4 modulation that doubles the bandwidth. As the number of lanes and modulation speeds increase, generally so does a need for equalization and power consumption.

Thus the conventional switch is seriously limited by the architecture of a central switch IC connected to optical transceivers in the front panel, and the constraints are increasing with newer generations of switches. These constraints may include:

Cost of the optical transceivers.

Power consumption, where perhaps 30%-50% of the total power is expended in equalizing/regenerating electrical signals as data is transferred back and forth from the switch IC and in/out of the transceivers. A considerable amount of power may be consumed by the optical transceivers on the front panel, where airflow is often restricted.

Panel density—the size of the transceivers is such that one can only get a limited number on the front panel and thus only a limited bandwidth out of the front panel of the switch.

BRIEF SUMMARY OF THE INVENTION

Aspects of the invention provide a switch module comprising: a switch integrated circuit (IC) chip including a switch for routing inputs to outputs of the switch IC chip; a silicon photonics chip including photodetectors for use in converting first optical signals to first electrical signals and modulators for modulating second optical signals in accordance with second electrical signals, outputs of the photodetectors being coupled to inputs of the switch IC chip and outputs of the switch IC chip being coupled to the modulators; a planar lightwave circuit (PLC) optically coupled to the photodetectors and modulators of the silicon photonics chip.

Aspects of the invention provide a switch module comprising: a switch integrated circuit (IC) configured to receive and transmit electrical signals, with the electrical signals routed between various inputs and outputs of the switch IC; a silicon photonics chip coupled to the switch IC, the silicon photonics IC configured to convert optical signals to electrical signals provided to the switch IC and to modulate light from a light source based on electrical signals received from the switch IC; a planar lightwave circuit (PLC) chip comprising: a plurality of first waveguides, each configured to receive light from at least one of a plurality of light sources and output the at least one of the plurality of light sources to the silicon photonics chip; and a multiplexer having a plurality of inputs and an output, the multiplexer configured to produce an optical signal on a wavelength selective basis using modulated light provided by the silicon photonics chip.

These and other aspects of the invention are more fully comprehended upon review of this disclosure.

BRIEF DESCRIPTION OF THE FIGURES

Aspects of the disclosure are illustrated by way of examples.

DETAILED DESCRIPTION

Figure 1A:
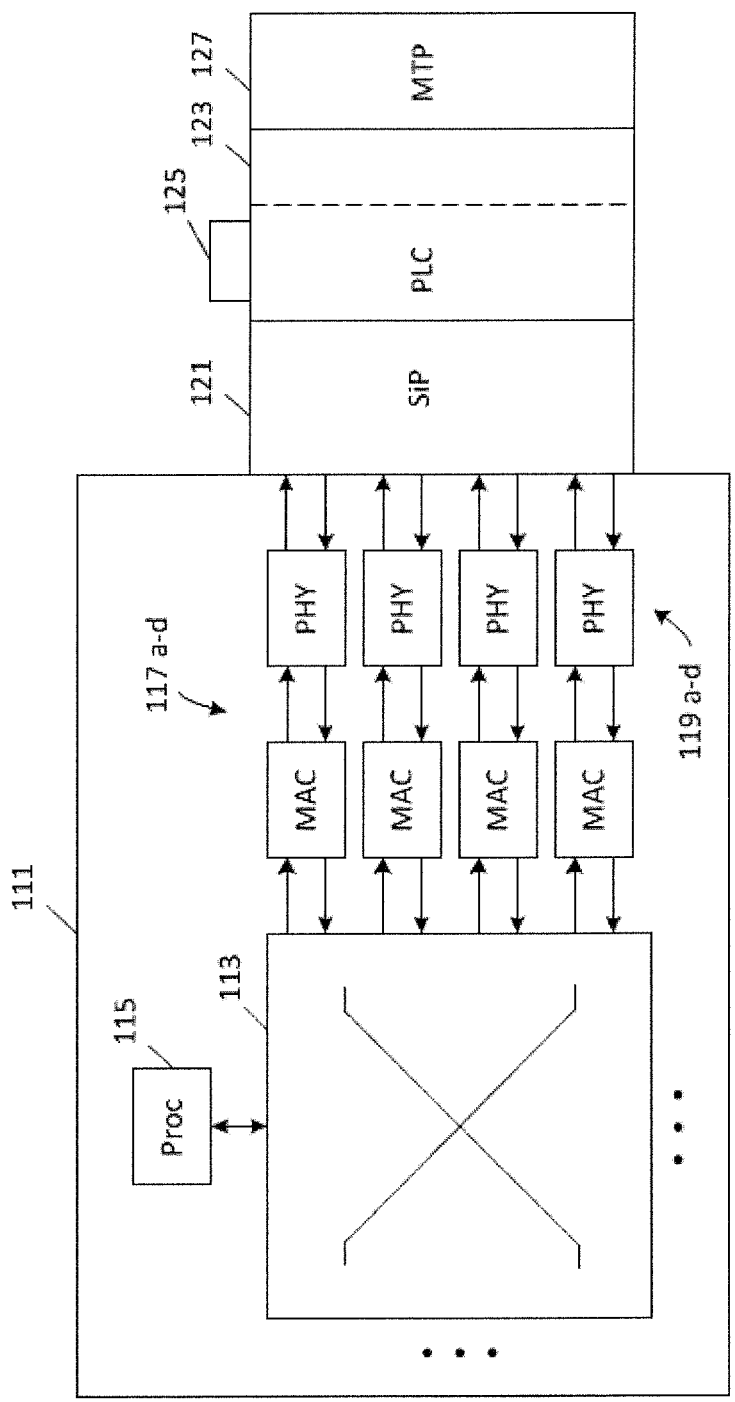
FIG. 1A is a block diagram of a switch module in accordance with aspects of the invention.
Figure 1B:
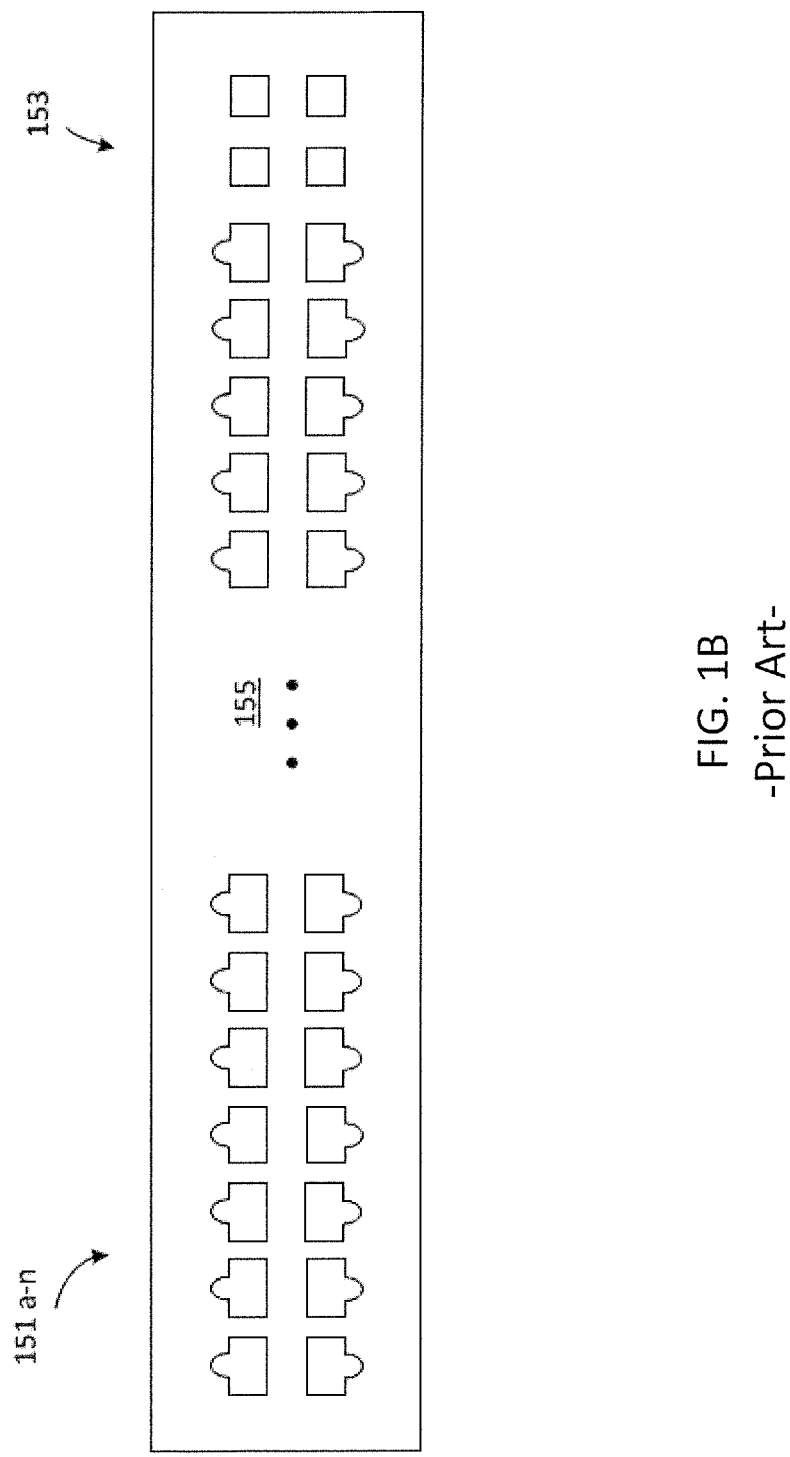
FIG. 1B (prior art) shows a switch enclosure with a switch IC and with sockets for optical transceivers.

FIG. 1 is a block diagram of a switch module in accordance with aspects of the invention. The switch module includes a switch IC chip 111, a silicon photonics chip 121, and a PLC 123. A light source module 125 is coupled to the PLC, as is a connector 127 for fiber optic lines. The switch IC chip and the silicon photonics chip are electrically coupled so as to pass electrical data between themselves, while the silicon photonics chip and PLC are configured to pass optical data between themselves. The light source module, which for example may include a plurality of lasers or optical gain chips, is also optically coupled to the PLC.

In operation, the switch module receives and transmits optical data over the fiber optic lines. The received optical data is provided to the silicon photonics chip by the PLC, with the silicon photonics chip converting the received optical data to received electrical data. The received electrical data is passed to the switch IC chip, which determines routing of the data, which may include routing of at least some of the data back to the silicon photonics chip as electrical data for transmission. The silicon photonics chip converts the electrical data for transmission to optical data for transmission, using for example light from the light source module, which is provided to the silicon photonics chip by the PLC. The optical data for transmission is passed through the PLC to the connector 127, and sent over the fiber optic lines.

The switch IC chip includes a switch 113, which routes data between switch inputs and switch outputs. The routing of the data is generally controlled by a switch IC chip processor 115, which for example may utilize information of the data, for example in packet headers, as well as routing table maintained by the processor in determining routing of the data between switch inputs and switch outputs.

As illustrated in FIG. 1, four transmit/receive chains are shown as coupled to the switch 113. In most embodiments, however, many more transmit/receive chains would be coupled to the switch. Similarly, although each transmit/receive chain is shown as including Media Access Control (MAC) circuitry 117a-d and physical layer (PHY) circuitry 119a-d, in various embodiments various buffers, priority queues, and other circuitry may be interposed between the MAC circuitry and the switch.

Also as illustrated in FIG. 1, only a single silicon photonics chip and PLC pair are explicitly shown, with the four illustrated transmit/receive chains of the switch IC chip providing data to and receiving data from the silicon photonics chip. In most embodiments, however, additional silicon photonics chip and PLC pairs would also be provided.

The switch module itself, in many embodiments, would be within an enclosure, which would also generally include power supplies, cooling fans, potentially a CPU module, and possibly other items. A front panel of the enclosure may also provide connectors for fiber optic lines. In general, however, unlike the situation discussed with respect to FIG. 1B, the front panel would not be equipped with optical transceivers, as the silicon photonics chip and PLC pairs may be considered as generally performing functions which would otherwise be performed by the optical transceivers.

Figure 2:
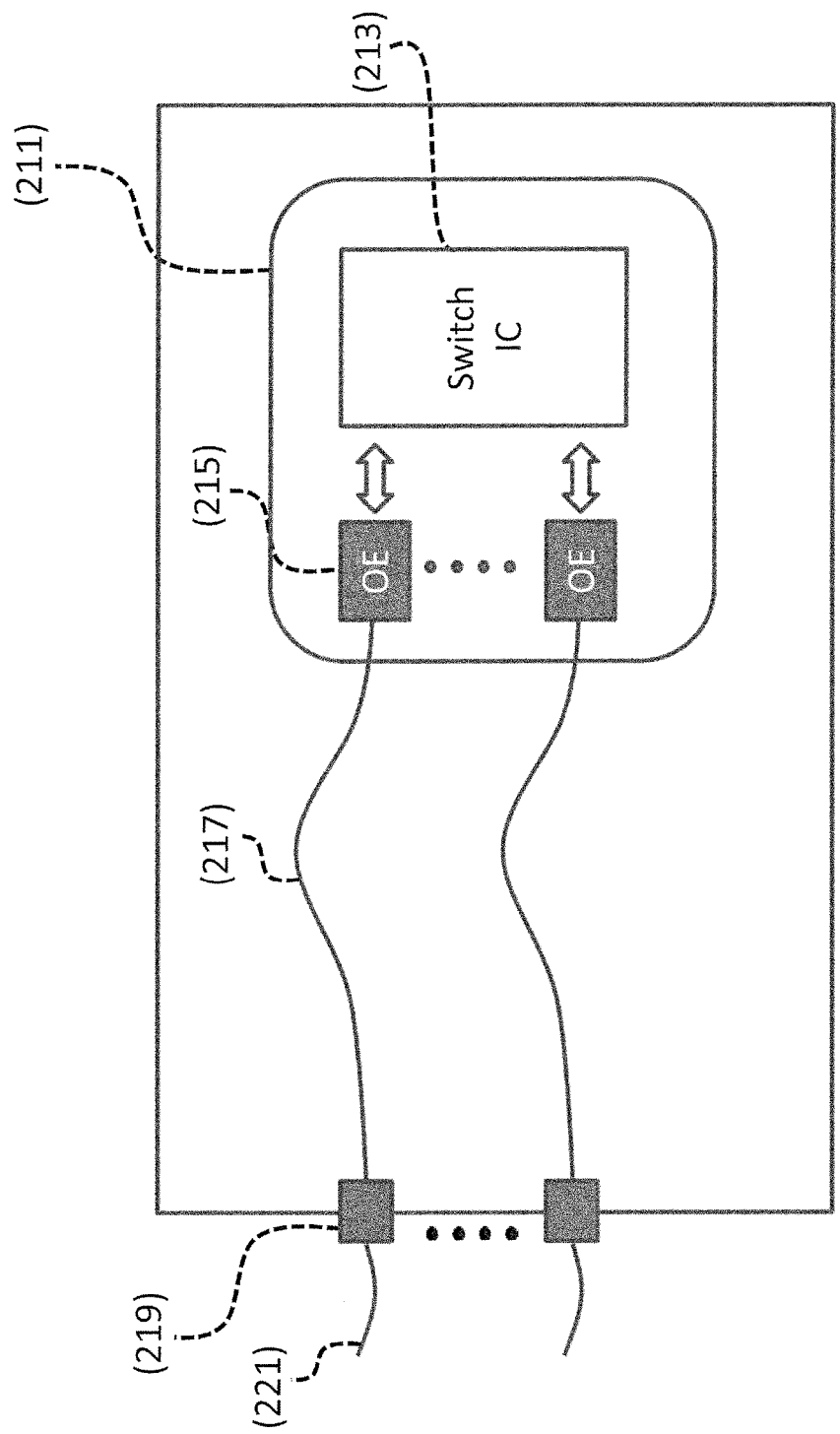
FIG. 2 illustrates a switch package comprising a switch IC and optical modules in accordance with aspects of the invention.

FIG. 2 illustrates a switch package comprising a switch IC and optical modules in accordance with aspects of the invention. A central package 211 contains the optical IC also contains the optical/electrical (OE) conversion modules 215 that convert the electrical 10 of the switch chip 213 to optical signals. They are cooled by a common central heatsink (not shown) and are connected to the front of the switch with an optical fiber. At the front panel of the switch there is no need for transceivers, since a patch panel 219 connects inside fiber links 217 to outside fiber links 221. Since signals are routed optically from the switch IC to the front panel, there is almost no degradation and, in many embodiments, no need for signal equalization. The electrical link between the IC and the OE modules are very short and therefore may not require reshaping, or in some embodiments retiming. Eliminating these equalization circuits saves considerable amount of power and complexity. In addition, front panel density may be increased since patch panels can be connected very tightly and one can get much denser JO than when using optical transceiver subassemblies. There is no heat generated in the front panel, where cooling is harder. The OE modules that generate heat, do so at the center of the board where there is room for a large heatsink and good airflow. Since no extra packaging is required for the electronics of the transceivers, and equalization circuitry may often be omitted, and CDR circuitry complexity also possibly reduced, the OE modules are cheaper than transceivers and thus the overall cost of a populated switch is much cheaper with this configuration.

Previously such a configuration was not possible because of certain limitations of optoelectronic devices. The density of electrical signals is very high in and out of the switch IC. If one devotes a single fiber to each electronics lane, one would need many fibers and the solution becomes unwieldy. For example for the previously described switch with 128 lanes of 25 Gb/s, there would be the need for 128 input fibers and 128 output fibers. Fiber optic alignment, especially single mode fiber alignments requires very tight tolerances. This increases the complexity and the packaging cost. One can reduce the number of fibers by using lasers of different wavelengths and multiplexing the different wavelengths into a smaller number of fibers, with each fiber carrying 4 or 8 wavelengths. This reduces the fiber count by the same amount. However, devices used to multiplex wavelengths tend to be either complicated or temperature sensitive. As we noted previously, the switch IC generates considerable optical power and therefore temperature could be an issue. An additional issue with temperature is that lasers do not operate well at high temperature, especially lasers that can be modulated at high speed. Placing such lasers on top of the switch IC or in near proximity means the lasers run hot and are therefore inefficient and perhaps slow.

Architectures discussed herein generally route optical signals directly to a switch IC, by way of a silicon photonics chip and considerably simplify the switch in datacenter applications and more generally in electronics where high speed signals are to be routed.

Figure 3:
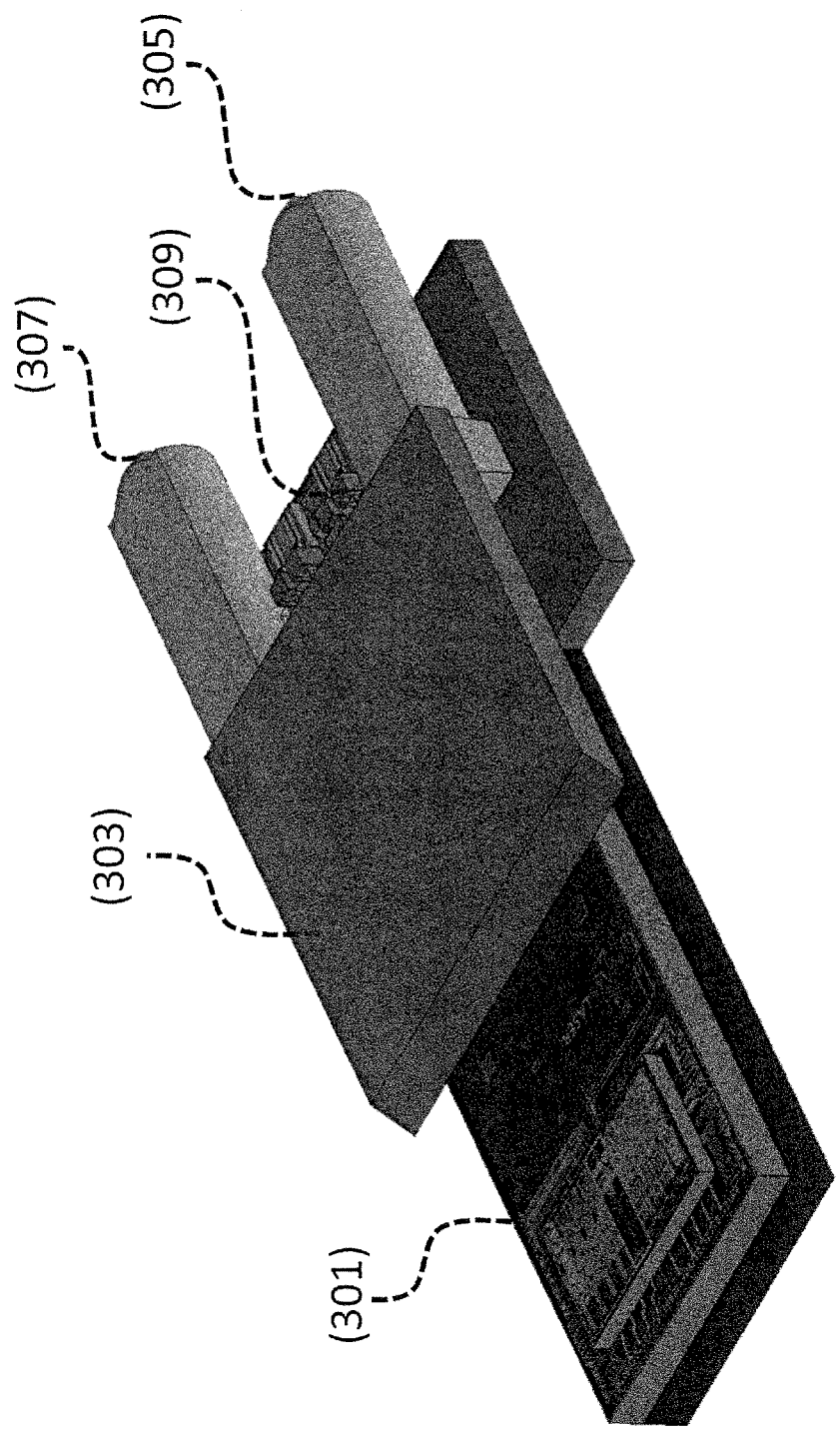
FIG. 3 shows the architecture using a silicon photonics IC that has built in modulators and a receiver, together with the electronics.

FIG. 3 shows an architecture for optical interconnect applications that includes optical wavelength multiplexers and demultiplexers in a glass PLC and optical modulators in silicon. The architecture uses a silicon photonics IC 301 that has built in modulators and a receiver, together with electronics. The configuration actually includes two separate chips, that are for example bonded together with a copper pillar process. The lower chip is the silicon photonics optical chip that includes grating couplers to allow the light to enter and exit the chip, germanium detectors to receive the input light and modulators to impose a signal on the optical channels for the transmitter. The top chip is an electronics chip that contains amplifiers, drivers and CDRs. Input data comes in four wavelength lanes through one input fiber 305. The light is demultiplexed by a PLC 303 into four separate waveguides. The PLC is polished at an angle such that the four separate wavelengths in four separate waveguides are reflected downwards into a silicon photonics chip, where there are four grating couplers. These grating couplers send the light into four waveguides into the silicon photonics chip where they are received by germanium photodetectors, which provide electrical signals. The electrical signals are amplified by a TIA, and in some embodiments equalized and clocked by a CDR and exit the silicon photonics chip assembly. For the transmit fiber 307, there are four continuous wave (CW) (or always on) lasers are coupled to four waveguides in the PLC. The light from these waveguides are deflected down by the same angle polish into the silicon photonics chip and enter waveguides in the silicon photonics chip through grating couplers. The light in the four waveguides are then modulated by data signals and exit the chip through grating couplers, once again entering the PLC. The PLC contains a transmit AWG that multiplexes the channels together into a single output, provided to the transmit fiber 307.

This particular architecture is very useful for hybrid integration with silicon ICs. In various embodiments:
  The wavelength multiplexer and demultiplexer is made from glass waveguides on a silicon wafer (PLCs). These structures are relatively temperature insensitive and therefore are generally not affected by the high power dissipation from the silicon switch IC.
  The lasers are made of Indium Phosphide and are CW lasers, not modulated lasers. Such lasers are also relatively temperature insensitive, compared to modulated lasers or lasers made of composite materials directly on the silicon wafer. In some embodiments the light sources are gain chips using reflective element in the PLC.
  The lasers are on a different side and somewhat away from the silicon IC. This allows the lasers to be cooled and keeps the RF signals and DC signals separated.
  Connecting fibers to PLCs is a well established technology and can be done easily in an automated manner. Similarly the architecture is well suited to MEMS based alignment for the coupling of lasers 309 to the PLCs. This is an efficient and automated way of coupling light into the PLC.

Figure 4:
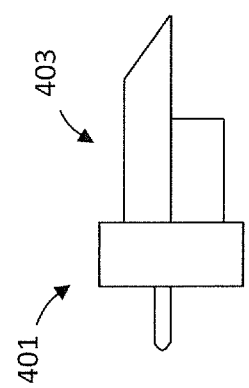
FIG. 4 shows an angle polished PLC that is directly connected to an MTP or arrayed fiber connector.

FIG. 4 shows an angle polished PLC 403 that is directly connected to an MTP or arrayed fiber connector 401. The individual cores of fibers in the connector are epoxied to the PLC such that light from those fibers are coupled to the waveguides of the PLC.

Figure 5:
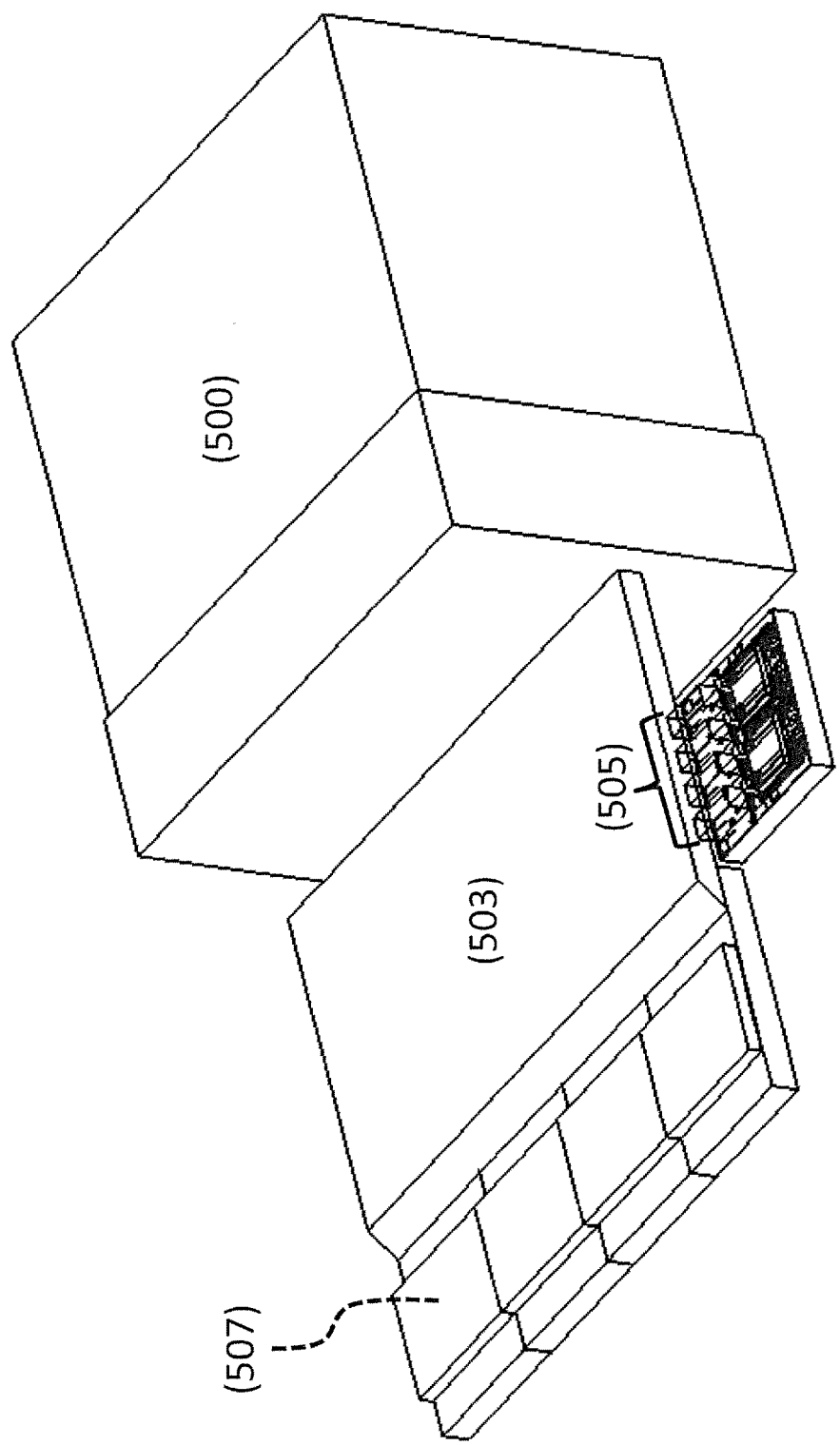
FIG. 5 shows a quad architecture where four lasers are coupled into an array of four assemblies somewhat similar to the previously described architecture.

FIG. 5 shows a quad architecture where four lasers are coupled into an array of four assemblies somewhat similar to the previously discussed architecture. Four lasers 505 are coupled to the side of the PLC 503 using MEMS coupling, for example as discussed in U.S. patent application Ser. No. 14/621,273 filed on Feb. 12, 2015 entitled PLANAR LIGHTWAVE CIRCUIT ACTIVE CONNECTOR, and/or U.S. Pat. No. 8,346,037 issued on Jan. 1, 2013 entitled MICROMECHANICALLY ALIGNED OPTICAL ASSEMBLY, the disclosures of which are incorporated herein by reference for all purposes. The signals from the four lasers are routed on the PLC to a quad version of the silicon photonics chip 507 previously discussed. Since each silicon photonics chip modulates four channels, there are 16 different lanes of output. These go into 4 transmit fibers, each fiber containing four wavelengths. The receive side is similar with 16 lanes entering, broken down into 4 waveguides with 4 wavelengths in each. The MTP connector 500 thus has 4 input waveguides and 4 output waveguides. If each lane is modulated at 25 Gb/s, that yields 400 Gb/s in and out of the assembly.

Figure 6:
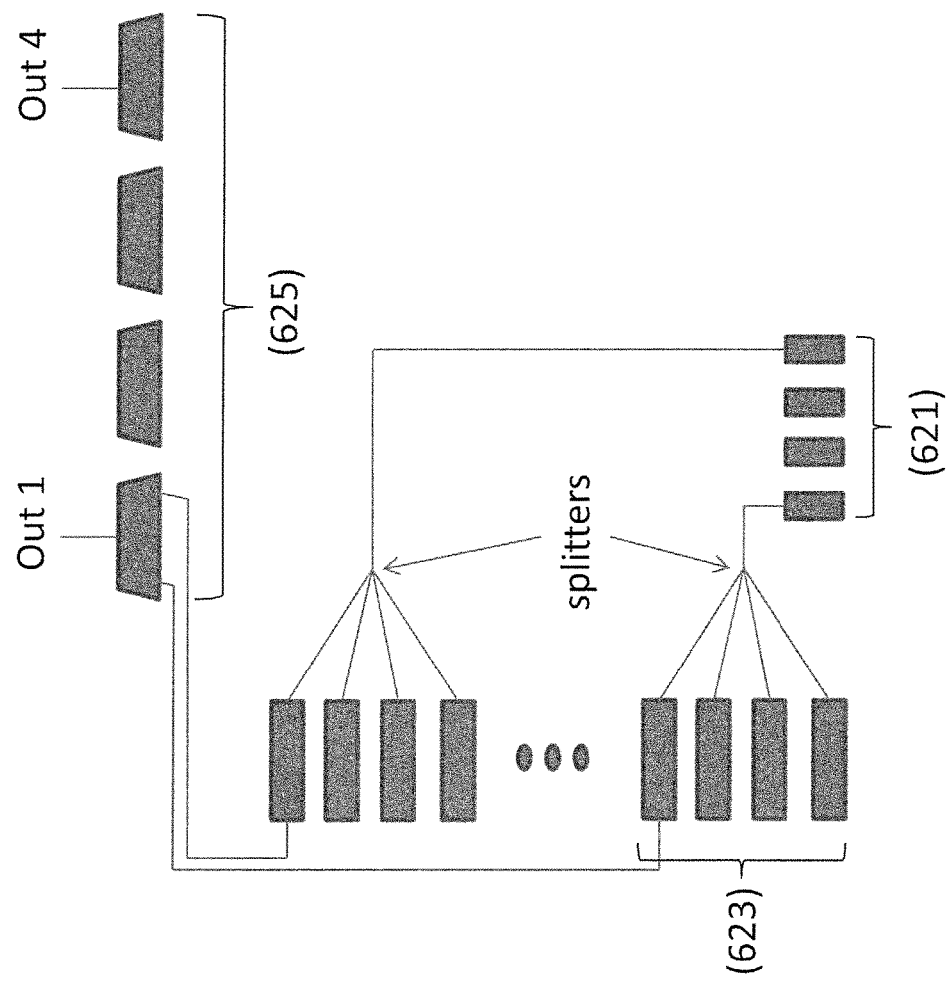
FIG. 6 shows a potential routing on the PLC.

FIG. 6 shows an example routing on the PLC. Light from each of the CW lasers 621 is split into 4 waveguides 623. The light is the coupled into the silicon photonics chips where they are modulated, using data signals provided to the silicon photonics chips. The modulated light is combined into 4 output waveguides 625, each waveguide containing four wavelengths. Note that there are different configurations possible, but with the same result. For example the splitters could be implemented in the PLC or in the silicon photonics chip. Similarly, the same wavelength could be sent to all four modulators in one chip or all four wavelengths could be sent to all four modulators on one chip. In general, the outputs are sorted such that each waveguide output at the end contains all four wavelengths. In FIG. 6 only the transmit paths are shown, not the receive paths, and only a fraction of the waveguides are shown for simplicity. However, the PLC would contain four splitters to take the light from the 4 CW lasers and break them up into 16 lanes. It would also contain 4 AWGs, or one cyclic AWG to take the 16 modulated channels and combine them into four output waveguides. On the receive side, the PLC would contain four AWGs or a cyclic AWG that would take the 4 inputs each input with 4 wavelengths into 16 channels for the receiver.

Figure 7:
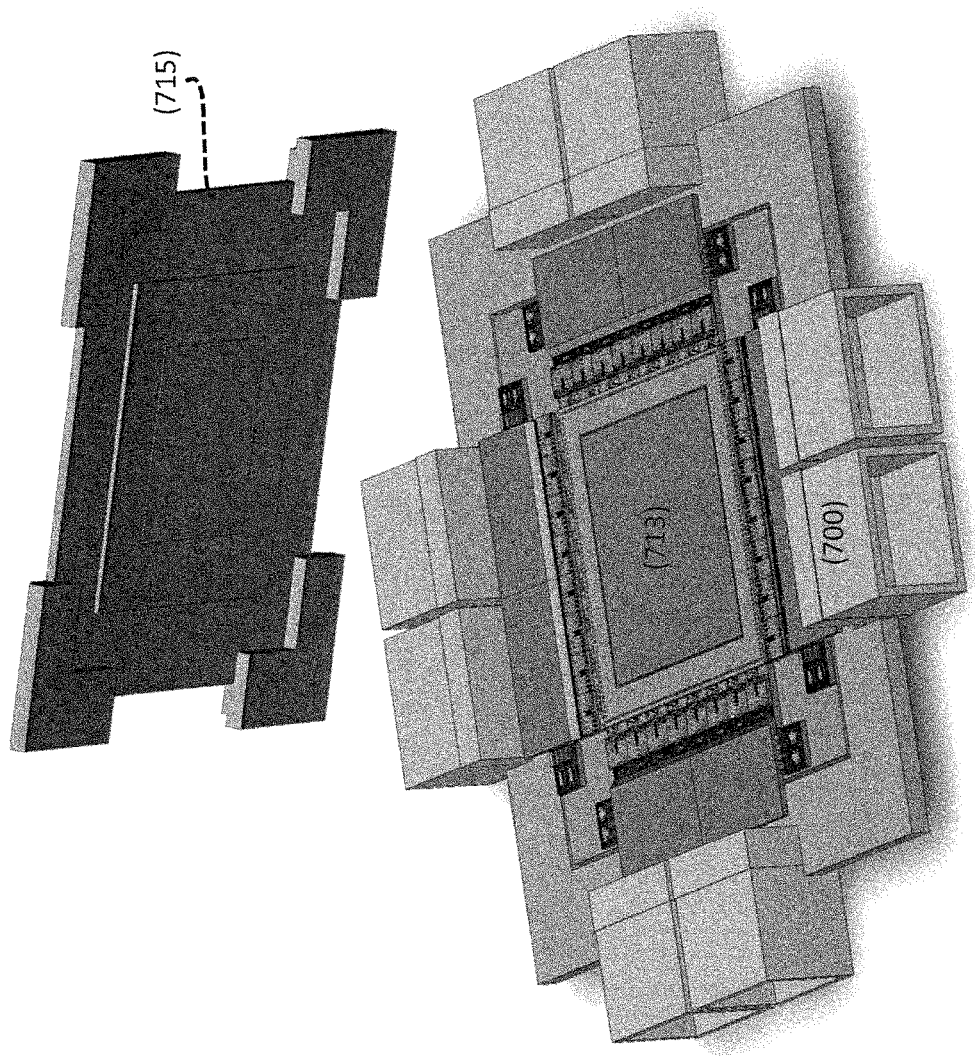
FIG. 7 shows the complete assembly of 8 modules, each running with 16 lanes of 400 Gb/s packages together with the switch IC.

FIG. 7 shows the complete assembly of 8 modules, each running with 16 lanes of 400 Gb/s packaged together with the switch IC 713. This provides 3.2 Tb/s input and output to the switch IC. There are 8 MTP connectors 700, each of which has at least 4 transmit fibers, 4 receive fibers, each fiber carrying 100 Gb/s either in or out. These MTP connectors would be connected to the front panel of the switch module using fibers. The front panel of the switch module would then be simply a patch panel, either with MTP connectors or broken up into 4 separate dual single mode fibers with potentially LC connectors. Note that even though there are 32 input and 32 output fibers and each fiber containing 4 wavelength lanes, that there are only 8 lasers of each wavelength. The lasers are separated somewhat from the switch IC and heatsunk to the metallic base plate. A metallic cover 715 also helps spread the heat, such that the heat from the switch IC is dissipated and the lasers stay relatively cool. As CDRs for signals passed between the silicon photonics modulators and the switch IC in various embodiments cannot include or have associated equalization circuits, can be lower performance than generally used for 40 GHz signals (or 10 GHz signals in various embodiments), or in some embodiments be switched off completely or omitted, the overall power consumption is reduced considerably, leading to less heating. With current technology, we expect each 100 G module to consume about 1.5 W with no CDRs, such that 32 such modules would consume about 50 W or so. The switch IC would consume about 200 W.

Figure 8:
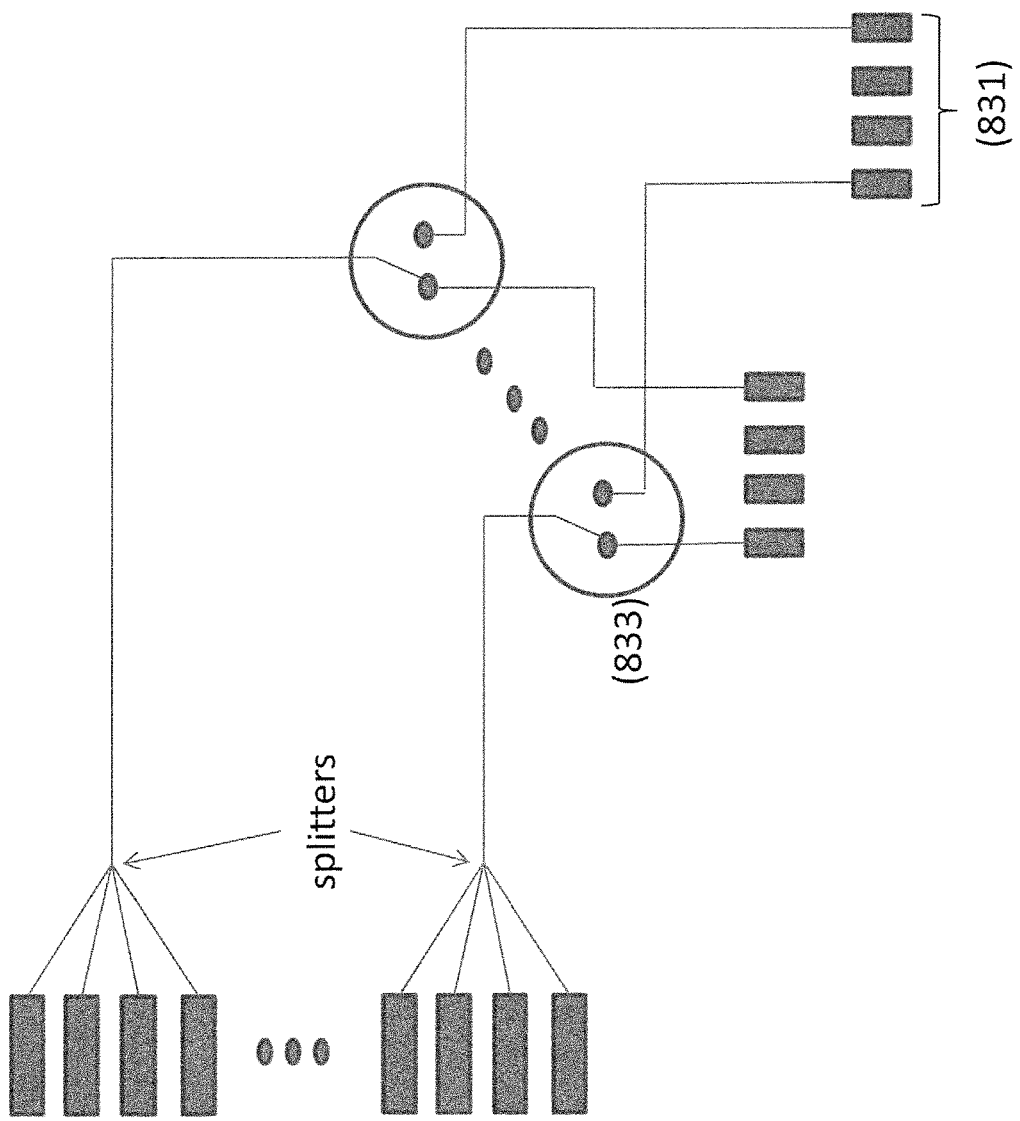
FIG. 8 illustrates a PLC that includes backup lasers in accordance with aspects of the invention.

FIG. 8 illustrates a PLC that includes backup lasers in accordance with aspects of the invention. There are a number of variations in this architecture. For example, for additional reliability, one could insert backup lasers 831 into the system. Should a laser fail, the electronics could turn on a backup laser. These backup lasers could be connected to the system with a 3 dB coupler—which would incur an additional 3 dB loss. Alternatively, since the coarse wavelength division multiplexed grid is relatively broad, lasers of slightly different wavelengths could be wavelength multiplexed together with a low loss filter. The lasers would be close enough in wavelength such that either would fit in the same slot in the CWDM band. The simplest option is using an optical switch 833 in the PLC that would be much lower loss, but would use active control. Such optical switches can easily be implemented using a thermo-optic directional coupler or Mach-Zehnder architecture. Such a configuration is shown in FIG. 8. Not shown in the figures are monitor photodiodes that would likely be implemented either in the silicon photonics or as separate elements on the PLCs. These monitor diodes would report if a laser has failed and would direct the electronics control to switch on a backup laser. Implementing the routing for such on the PLC is straightforward.

Figure 9:
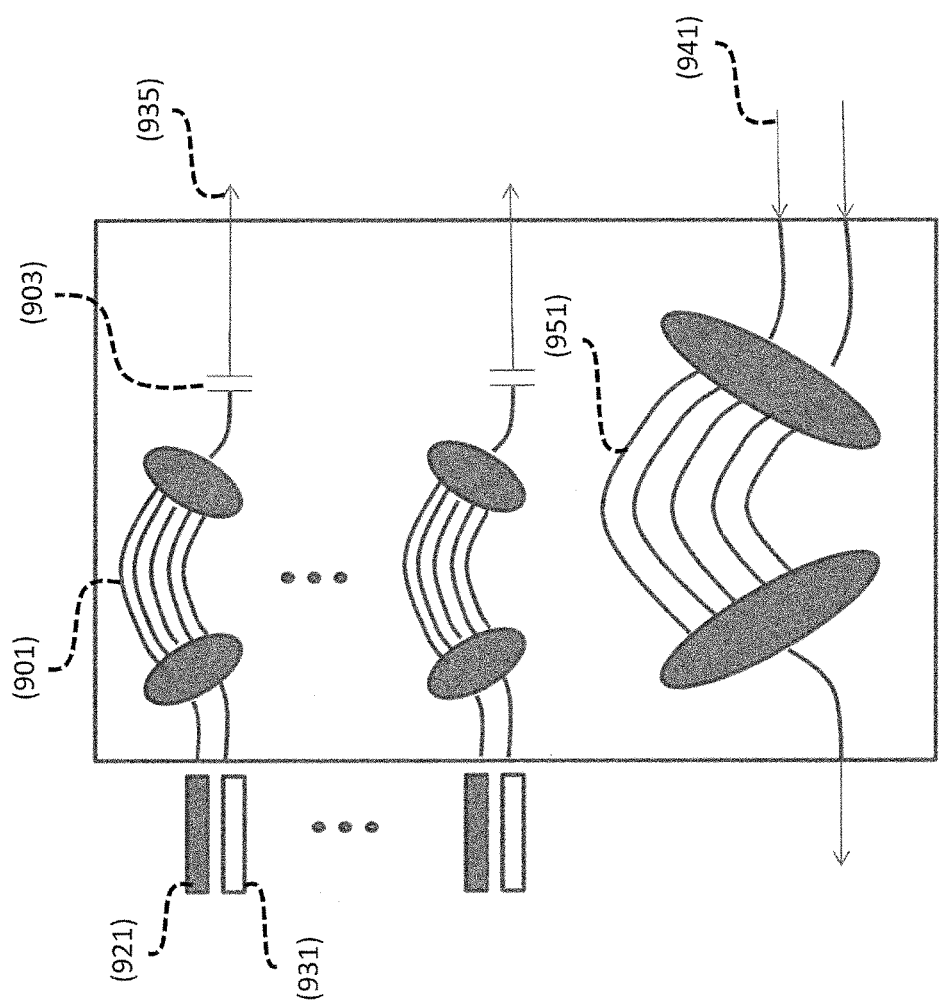
FIG. 9 illustrates a PLC that can provide the feedback necessary for locking wavelength of lasers in accordance with aspects of the invention.

FIG. 9 illustrates a PLC that can provide feedback for locking wavelength of lasers in accordance with aspects of the invention. The PLC is an excellent platform for integration and in fact the PLC can provide the feedback for locking the wavelength of the lasers. This makes the backup laser option very easy. FIG. 9 shows a schematic of such an implementation. In this case for each channel a primary and a secondary gain chip are coupled to a PLC. The gain chip does not have a grating or reflective facet coating in front, such that the light passes unimpeded from the semiconductor waveguide in to the PLC. The PLC contains a wavelength routing component such as an AWG 901 and at the output of this component there is a reflective element 903. This could be a Bragg grating, or simply a reflective coating (generally partially reflecting) on the PLC facet. Thus the gain chip lases through the PLC. This PLC would have channels that are closely spaced, such that the primary and the secondary gain elements would lase at slightly different wavelengths, but both would be within the passband of the communication channels. Thus if the primary laser 921 fails, perhaps due to degradation in the InP gain element, the secondary channel 931 would be activated. This would be a very slightly different wavelength but within the required band. All the wavelength channels would be backed up this way and the light would enter the silicon photonics chip to be modulated. The modulated channels would exit the silicon photonics chip and be multiplexed together with a second AWG, one with wider channel spacings corresponding to the system requirements (for example 20 nm for standard CWDM channels).

Another possibility would be to run both lasers simultaneously, such that each laser is running at a lower power, thus assuring greater reliability—thus there may be no need for backup laser. In fact a number of lasers, for example three, four, or more, can be "spectrally combined" in this way to yield much higher powers if needed for silicon photonics applications. If a larger number of lasers are combined, then the potential failure of a single laser is not catastrophic as it reduces the power by a smaller fraction.

The ability of the PLC to lock the wavelengths of gain elements is a very powerful tool and can be helpful when the number of channels go up and wavelength spacing of the lasers becomes narrower. In general, DFB laser wavelength is set by the grating in the DFB laser, and changes with temperature as the refractive index of the semiconductor changes with temperature at values roughly corresponding to 0.1 nm/C. For data center applications, channels spacings are CWDM or Course wavelength division multiplexed, spaced at 20 nm or so. This allows the lasers to change wavelengths by 80 C or ~8 nm without overlapping adjacent channels. However, if there is a desire to increase channel numbers from 4 to 16 or more, channel spacing may be reduced. This may necessitate a thermoelectric cooler to stabilize the laser wavelengths. For example there is another wavelength plan LAN-WDM that is 800 GHz or roughly 4.5 nm.

Alternatively one could use a PLC to stabilize the wavelength of a gain chip before coupling it to the silicon modulator. Schematically it may look like FIG. 10. An array of eight gain chips 1011 in the 1310 nm band are coupled to a PLC 1013. Within the PLC there are eight wavelength dependent structures that would feedback a different wavelength to each gain chip. For example these could be ring resonators as shown where the output of the gain chip couples to a ring (e.g. 1017a . . . h), and a single wavelength is transmitted. This transmitted wavelength then routed to a top side 1019 of the PLC chip that is high reflectivity (HR) coated and therefore is reflected back through the ring and back to the gain chip. The gain chip therefore lases through the PLC at the wavelength corresponding to the ring. There is a tap (e.g. 1021) also on the output of the laser that couples power to the output going to the silicon photonics. For an 8 channel system for a 400 G application, the wavelengths of the resonators would nominally be 1263.55 nm, 1277.89 nm, 1282.26 nm, 1286.66 nm, 1295.56 nm, 1300.05 nm, 1304.58 nm, 1309.14 nm. However, since the index change of the glass with temperature is only 0.01 nm/C, these would only change 0.8 nm over 80 C, and would be less than 20% of the band difference, therefore no thermoelectric cooler is needed. The light exiting the silicon photonics would enter the PLC again and be multiplexed together as previously described. Of course there are a variety of structures that could be used to get this implementation. Instead of ring resonators one could use AWGs or asymmetric mach-zehnder structures. Reflectors could be a coated side, a Bragg reflector, loop mirror, or reflection from a trench. Rather than a separate tap and reflector, one could use a partial reflector that transmits light to the output as well as reflects light back to enable lasing.

Figure 10:
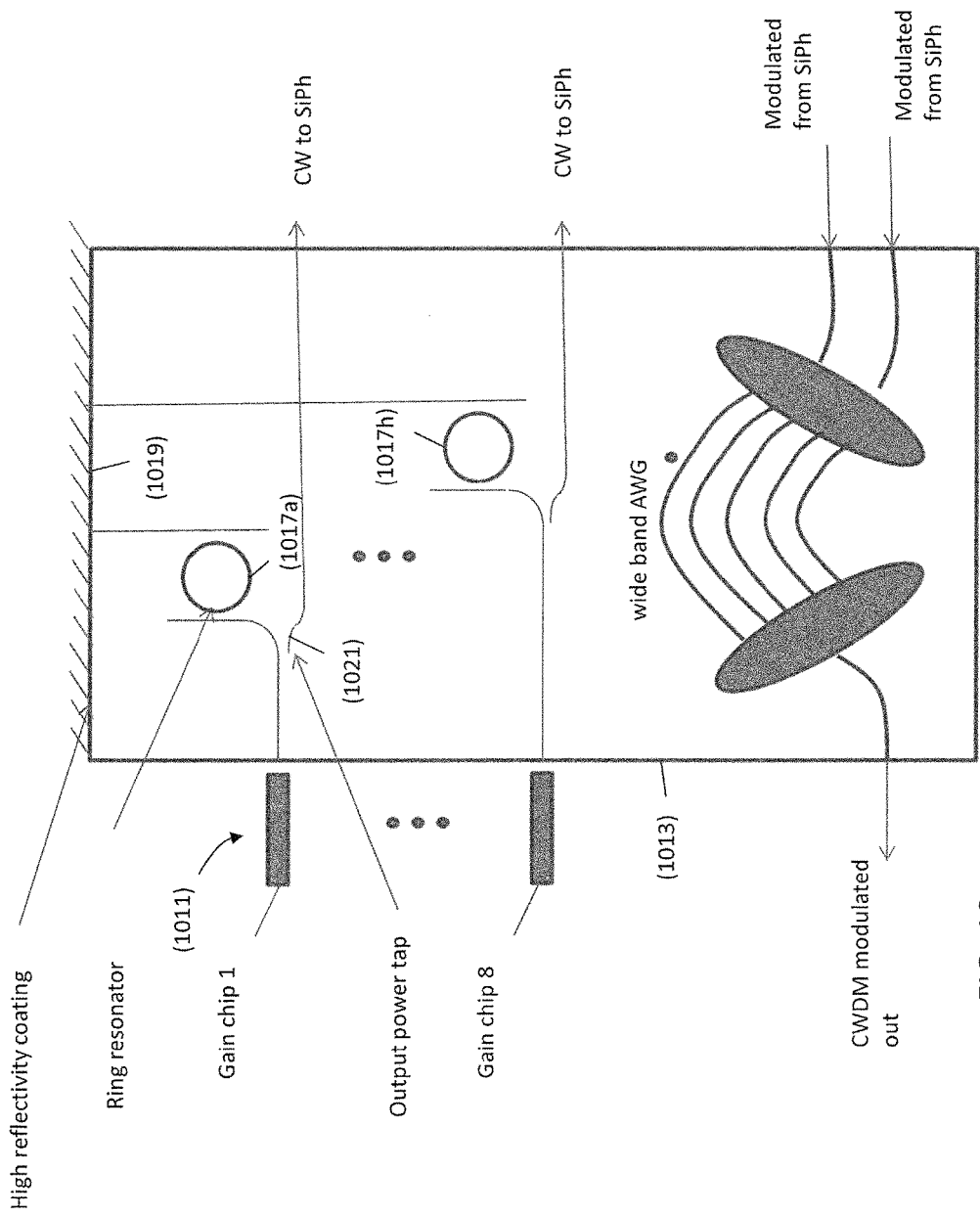
FIG. 10 illustrates gain chips coupled to a PLC in accordance with aspects of the invention.

The light sources of FIG. 10 could also have backup lasers as previously described. Alternatively, for higher reliability and the ability to replace failed components, the light source could be external to the entire assembly. The CW sources could be mounted in the front plate, such that if a light source fails, the CW source could easily be replaced. Given that the MTP connectors typically have 12 fibers and four channel systems only use eight fibers (four signal input and four signal output), the extra four fibers could be used as CW laser sources. These external light sources could be simple DFBs or gain chips lasing through a PLC, or even lasers with backup as previously described.

Another simple modification to the design is to replace the MTP connectors with fiber pigtails. In this case each 400 G module would have 8 fibers attached to the PLC through a fiber V-groove assembly. These fibers would have connectors that would mate to the front plate. The advantage of such an approach is that it eliminates the connectors on the IC package that can be unreliable and lossy.

Other modifications are that the silicon switch IC could contain all the functionality of the silicon photonics chip. So no separate ICs would be needed. The PLCs would mate directly to the silicon IC, as the switch chip would contain the modulators and receivers.

The configuration described herein is very scalable. One can increase or decrease the number of channels, vary the channel spacing, or change the modulation format. For example, the silicon modulators could be run using PAM4 modulation instead of NRZ—but the physical architecture stays the same.

Figure 11:
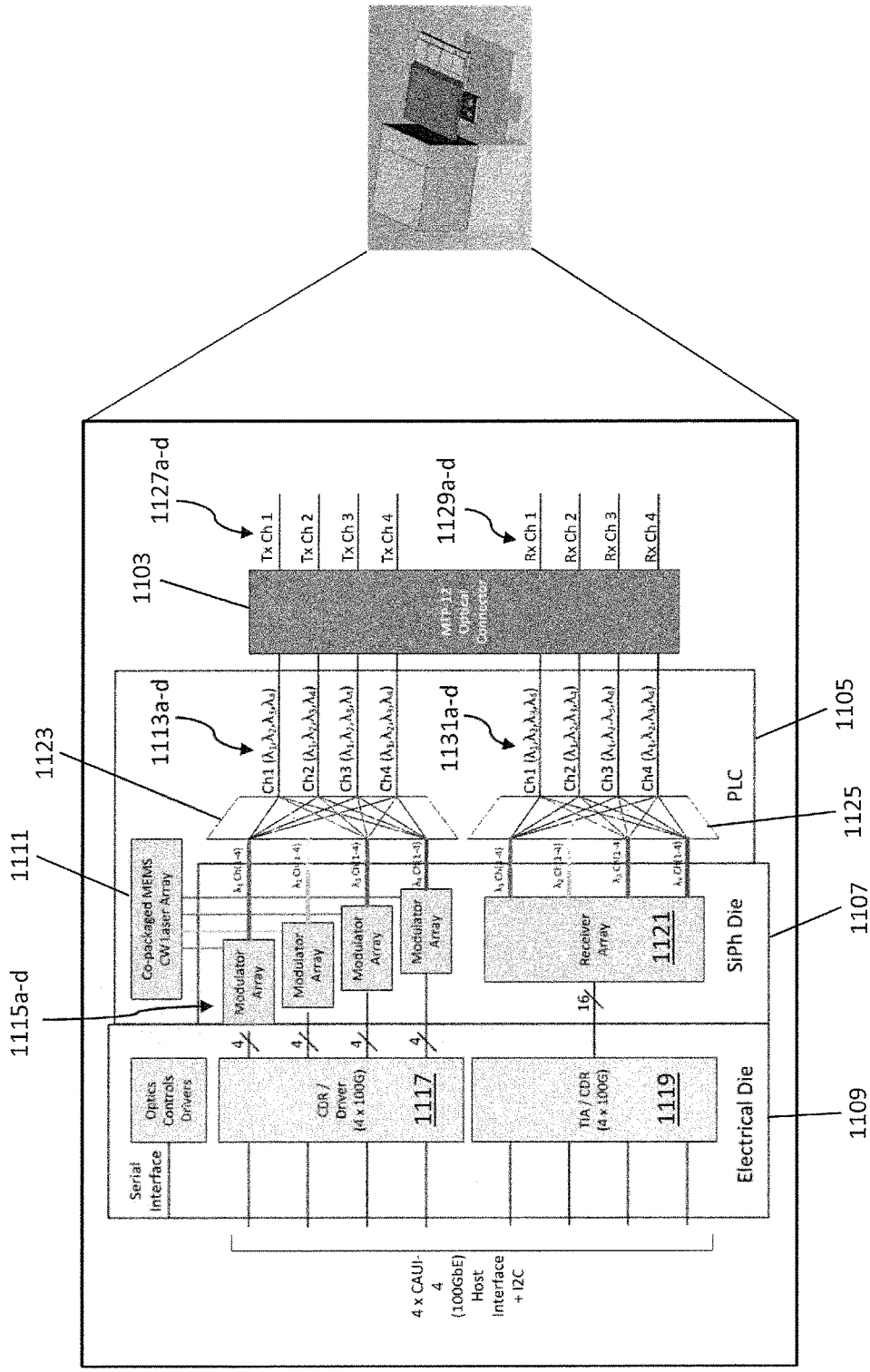
FIG. 11 illustrates a structure of a quad architecture similar to the previously described architecture in accordance with aspects of the invention.

FIG. 11 illustrates a structure of a quad architecture, similar to the previously described architecture, in accordance with aspects of the invention. As shown in FIG. 11, the architecture includes a PLC 1105 having optical wavelength multiplexers 1123, optical wavelength demultiplexers 1125, output waveguides 1113a-d, and input waveguides 1131a-d. The architecture further uses a silicon photonics IC 1107 that includes modulator arrays 1115a-d and a receiver array 1121. The architecture also includes an electronics chip 1109 that comprises drivers 1117, TIAs 1119, and, in some embodiments, CDRs which may be incorporated with the drivers and the TIAs.

In operation, light sources 1111 illuminate the modulator arrays, for example using lasers providing light in a continuous wave (CW). Light from the light sources splits into each of the modulator arrays. The modulator arrays modulate the light based on electrical signals provided by the drivers and provide modulated optical signals. In some embodiments, the light sources include four lasers and the modulator arrays are 16-element modulator arrays.

The modulated optical signals from each of the modulator arrays are passed to the optical wavelength multiplexers, with the multiplexers multiplexing the modulated optical signals into output waveguides of the PLC. The output waveguides provide optical data for transmission. In some embodiments each of the output waveguides provide light at four different wavelengths. In some embodiments the optical data for transmission is passed to an optical connector 1103 (e.g., MTP-12 optical connector), and sent over transmit fiber optic channels 1127a-d.

In some embodiments the PLC and the MTP-12 optical connector may be coupled using fiber pigtails. In some embodiments, rather than splitting the light into four outputs, sixteen light sources may be used where each group of four are approximately similar in wavelength. This, for example, would allow for elimination of the splitters, and lower power laser chips may be used. However, depending on the failure mode, reliability could be worse. This, for example, is because there is a higher probability of at least one light source being defective out of the sixteen light sources than there is in one light source being defective out of, for example, four light sources.

In some embodiments input optical data is received from receive fiber optic channels 1129a-d, which provide the input data to the optical connector 1103. The connector in turn provides the input data in wavelength lanes through input fibers (e.g., fiber pigtails coupled to the PLC), with each of the input fibers in some embodiments provides light at four different wavelengths. Light from the input fibers is demultiplexed by the demultiplexers 1125 of the PLC into separate waveguides, for example sixteen waveguides.

The separate waveguides are reflected into the receiver array 1121, that may include grating couplers (not shown) and germanium photodetectors (not shown). In some embodiments the grating couplers pass light from the waveguides into the silicon photonics IC where the germanium photodetectors receive the light and provide electrical signals. The electrical signals are amplified by the TIAs, and in some embodiments are equalized and clocked by a CDR.

Figure 12:
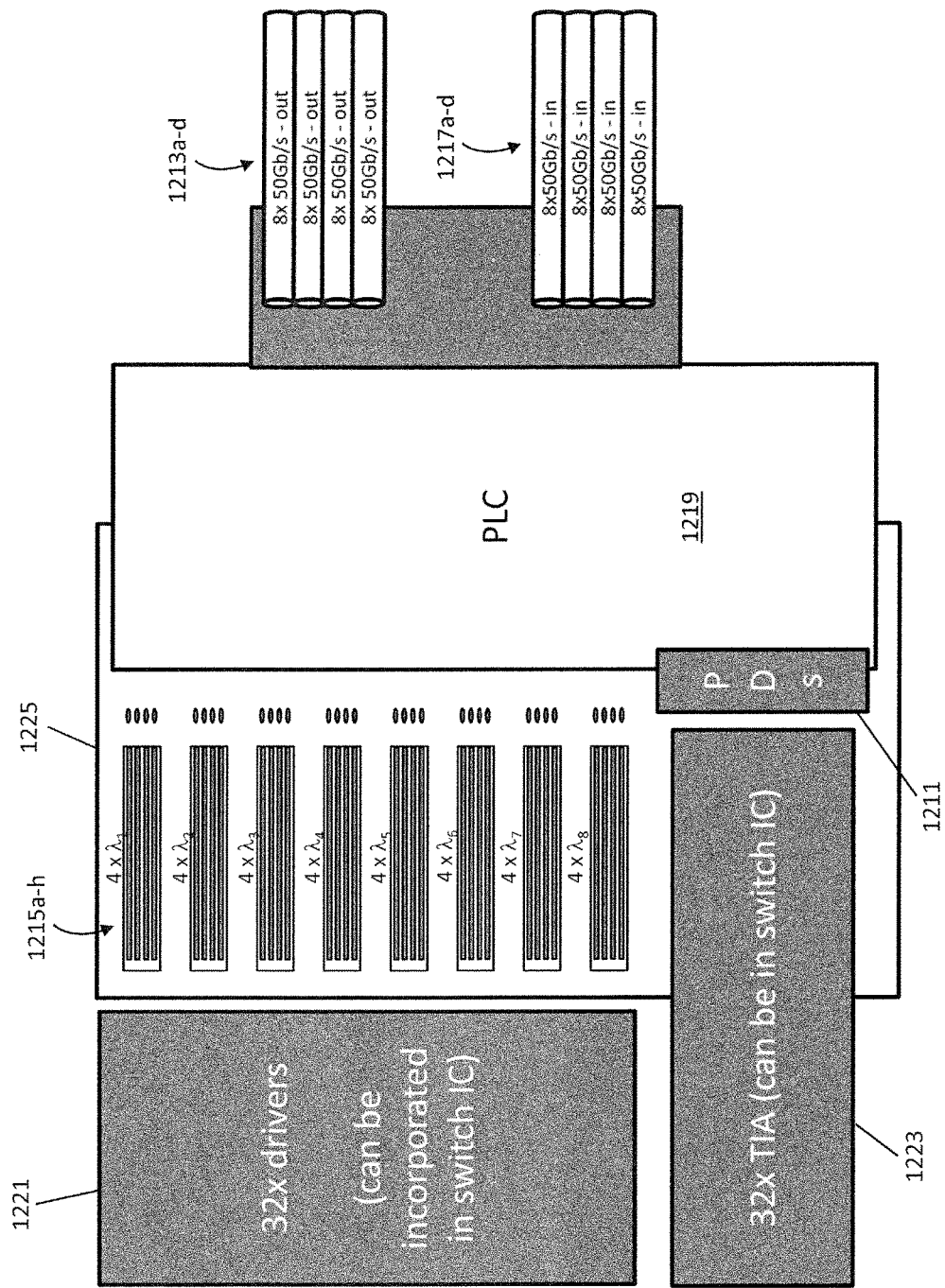
FIG. 12 shows a structure of a further architecture in accordance with aspects of the invention.

FIG. 12 shows a structure of a further architecture in accordance with aspects of the invention. The architecture, for example, may be a 1.6 Tb/s architecture, with each wavelength lane or channel running at 50 Gb/s. Referring to FIG. 12, the architecture may include a chip 1225 (e.g., InP chip) having light sources 1215a-h. To generate the eight wavelengths, for example, there are eight monolithic InP die, each of which includes four light sources of similar or same wavelength. In some embodiments, the light sources are directly modulated DFB lasers, driven by driver circuitry 1221. In some embodiments the lasers are CW lasers integrated with modulators. The modulator arrays modulate the light based on electrical signals received from driver circuitry 1221. In some embodiments, the light sources include 32 lasers and the modulator arrays are 32-element modulator arrays. In some embodiments the drivers circuitry is incorporated or integrated into a switch IC (not shown).

Optical signals from each of the lasers/modulator arrays are passed to a planar lightwave circuit (PLC) 1219. The PLC may include transmit AWGs (not shown) that multiplex the light from each of the modulator arrays into outputs, for example four outputs, provided to transmit fibers 1213a-d. In some embodiments each of the transmit fibers is 400 Gb/s with eight wavelengths in each fiber.

Input data may come in wavelength lanes through input fibers 1217a-d. In some embodiments each of the input fibers carries signals at 400 Gb/s, with eight wavelengths for 50 Gb/s in each fiber. Light from the input fibers, in some embodiments, is demultiplexed by the PLC into separate waveguides, for example 32 waveguides, for separate wavelengths. The demultiplexed light is received by photodetectors 1211 coupled to the PLC, with the photodetectors providing electrical signals. The electrical signals are amplified by TIAs 1223. In some embodiments the TIAs are also integrated into the switch IC (not shown).

Figure 13:
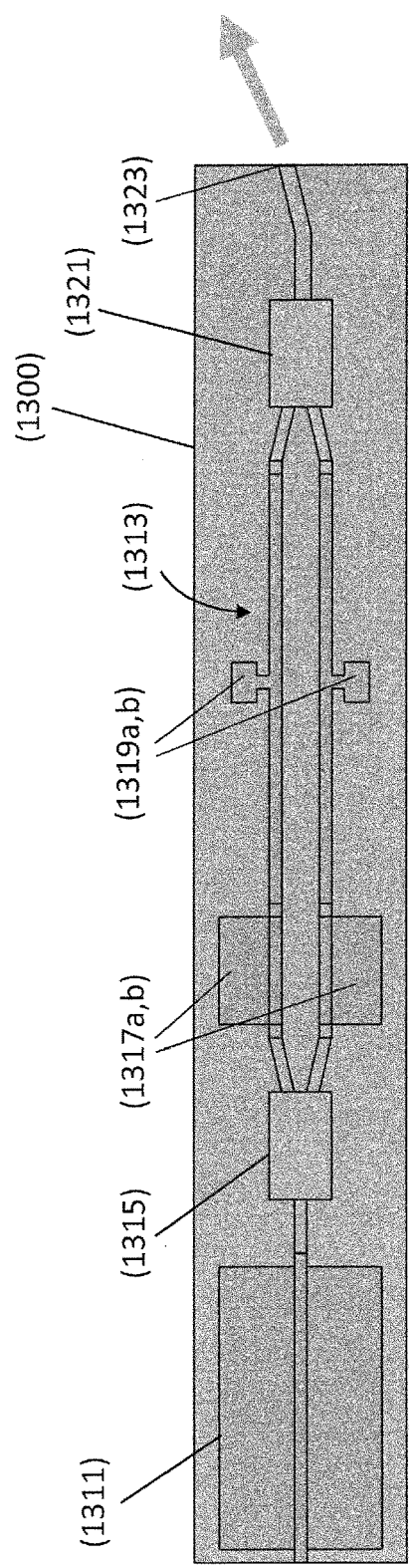
FIG. 13 is a diagram of a light source integrated with a modulator in accordance with aspects of the invention.

FIG. 13 is a diagram of a light source integrated with a modulator in accordance with aspects of the invention. In FIG. 13, a light source 1311 is integrated with a modulator 1313, with the light source and the modulator being integrated on a chip 1300. The modulator may include an optical splitter 1315, phase adjusters 1317a,b, electrodes 1319a,b, and an optical combiner 1321. In some embodiments the light source includes a CW InP laser and the modulator is an InP Mach-Zehnder modulator.

As illustrated in FIG. 13, the light source provides light to an optical splitter (e.g., a one-to-two optical splitter) that splits and provides light to the phase adjusters for adjusting optical phase of the light. The phase adjusters output phase adjusted optical signals to the electrodes which may serve to reduce transmission loss and provide low loss optical signals to the optical combiner for combining the low loss optical signals into an angled output 1323. In some embodiments the phase adjusters are DC phase adjusters. In some embodiments the electrodes are lumped or traveling-wave (TW) electrodes.

The chip 1300, for example, may operate well in an uncooled environment as the DC bias can compensate for changes in temperature changing the optical bandgap of the material. The chip may also operate at high extinction ratio with a precise and predictable transfer characteristics that is suitable for complex modulation, such as Pulse Amplitude Modulation with 4 levels (PAM4). In some embodiments the chip may be a source for implementation in the architecture shown in FIG. 12.

However, one issue with having a large number of light sources, such as 32 light sources for the 1.6 Tb/s architecture with each modulator having its own light source, is that if a single light source out of the 32 fails, usefulness of the architecture may be impacted. Since these light sources may be running at high temperatures, they may have lower reliability, and given the large number of light sources, it may limit the overall reliability of the architecture. If there may be a way to reduce the number of light sources and also provide for backup light sources, it may make the architecture more reliable. Such a way for example is shown in FIG. 14.

Figure 14:
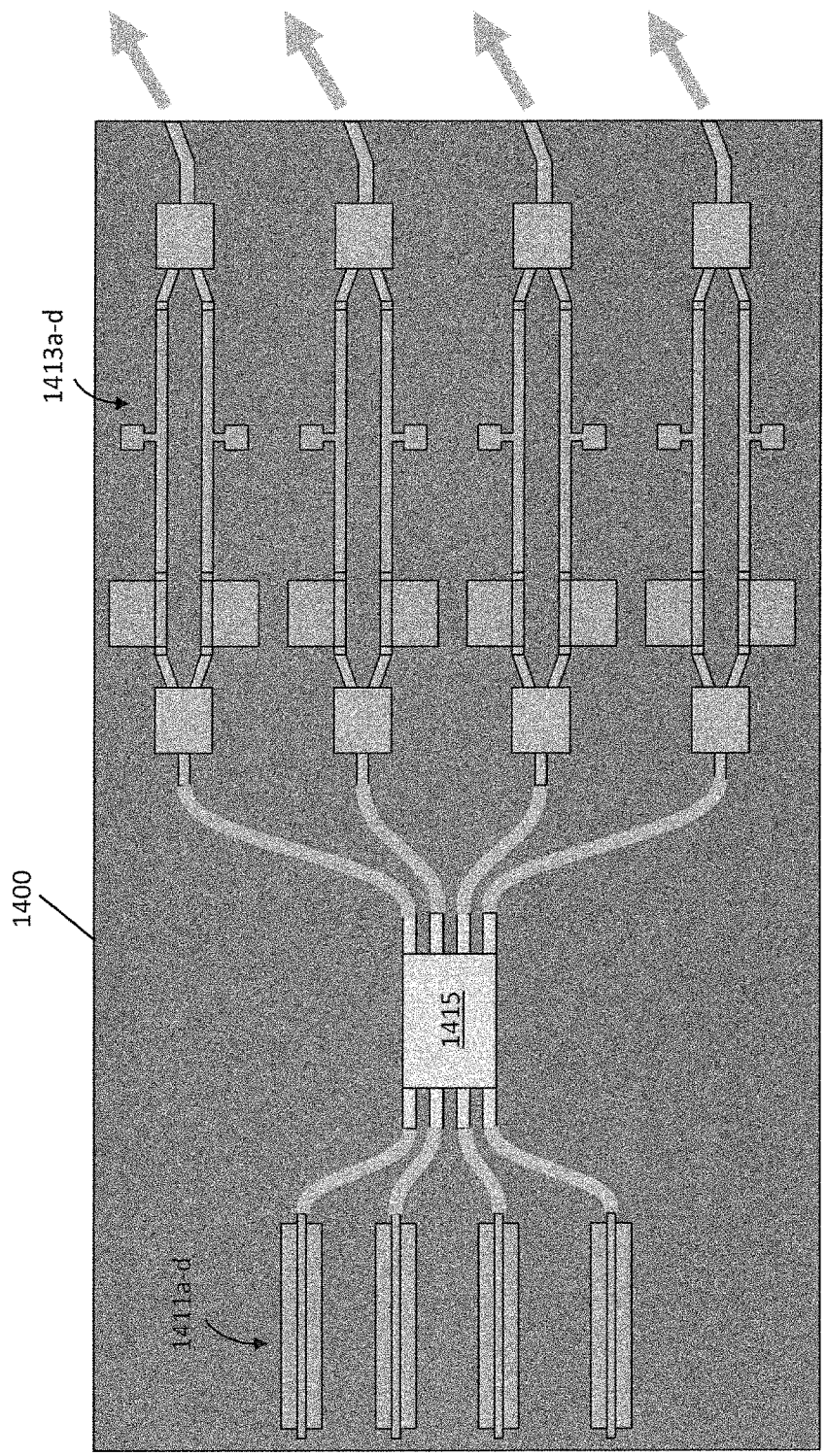
FIG. 14 is a further diagram of light sources integrated with modulators on a chip in accordance with aspects of the invention.

FIG. 14 is a further diagram of light sources integrated with modulators on a chip in accordance with aspects of the invention. As shown in FIG. 14, a chip 1400 (e.g., InP chip) includes light sources 1411a-d, which may include InP lasers in some embodiments, and modulators 1413a-d (e.g., InP Mach-Zehnder modulators). In some embodiments, each of the modulators may provide a 50 Gb/s optical signal. In some embodiments, each of the modulators is the modulator 1313 of FIG. 13. There may be eight of these chips in an architecture to provide for 32 wavelengths, for example, as shown in FIG. 12. Although there are four light sources shown in FIG. 14 along with four modulators, each modulator may not have a dedicated light source. For example the four light sources, of similar or same wavelength, may provide light through a splitter 1415 (e.g., a 4×4 splitter). In some embodiments, at any given time, only one of the four light sources is activated and the light from that single light source is split into four by the splitter and illuminates all four of the modulators. In various embodiments, compared to a structure where four light sources are illuminated simultaneously, this has a 4× reliability. For example, it is less likely for the one light source to fail than it is for at least one of a set of four light sources to fail.

In some embodiments, the light sources may draw higher power to allow for 4× splitting into the modulators. As further shown in FIG. 14, light from all of the light sources go into the splitter. If one of the light sources fails, for example, there are three spare backup light sources that may be activated in turn. The splitter has the same loss, for example, as a 1×4 splitter, thereby adding three extra light sources to the input of the splitter has nominal or no drawback. In various embodiments, the cost is minimal as there would be no increase in die size or extra lithography steps required. In some embodiments, in the case of silicon or external modulators that are not integrated with light sources, the same approach may be followed. This is shown, for example, in FIG. 15.

Figure 15:
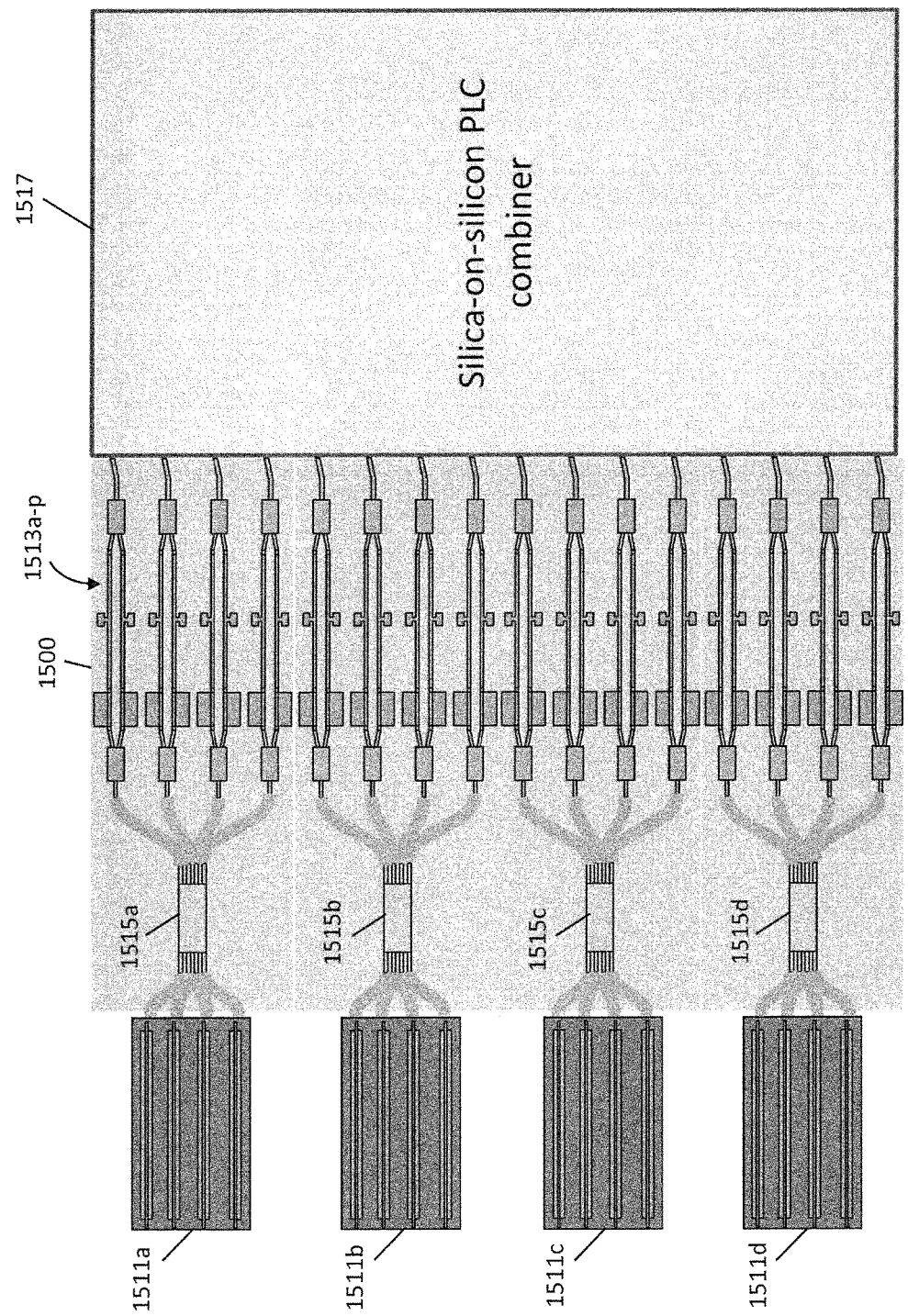
FIG. 15 illustrates a system in accordance with aspects of the invention.

FIG. 15 illustrates a system in accordance with aspects of the invention. In FIG. 15, each of chips 1511a-d, for example has four light sources of similar or same wavelength. The chips 1511a-d (e.g., InP laser chips) are optically coupled to a chip 1500 (e.g., a silicon photonics chip) that includes splitters 1515a-d and modulators 1513a-p, with each of the modulators in some embodiments is the modulator 1313 of FIG. 13. This in turn is coupled to a silica-on-silicon PLC 1517 that multiplexes the channels. In addition, there are various ways to divide up the functions between different materials. For example, the splitters may be made in the InP, in the silicon, or in a separate glass PLC. There are also various methods that may be used to couple the different materials, such as MEMS coupling, grating couplers, and/or butt coupling.

Figure 16:
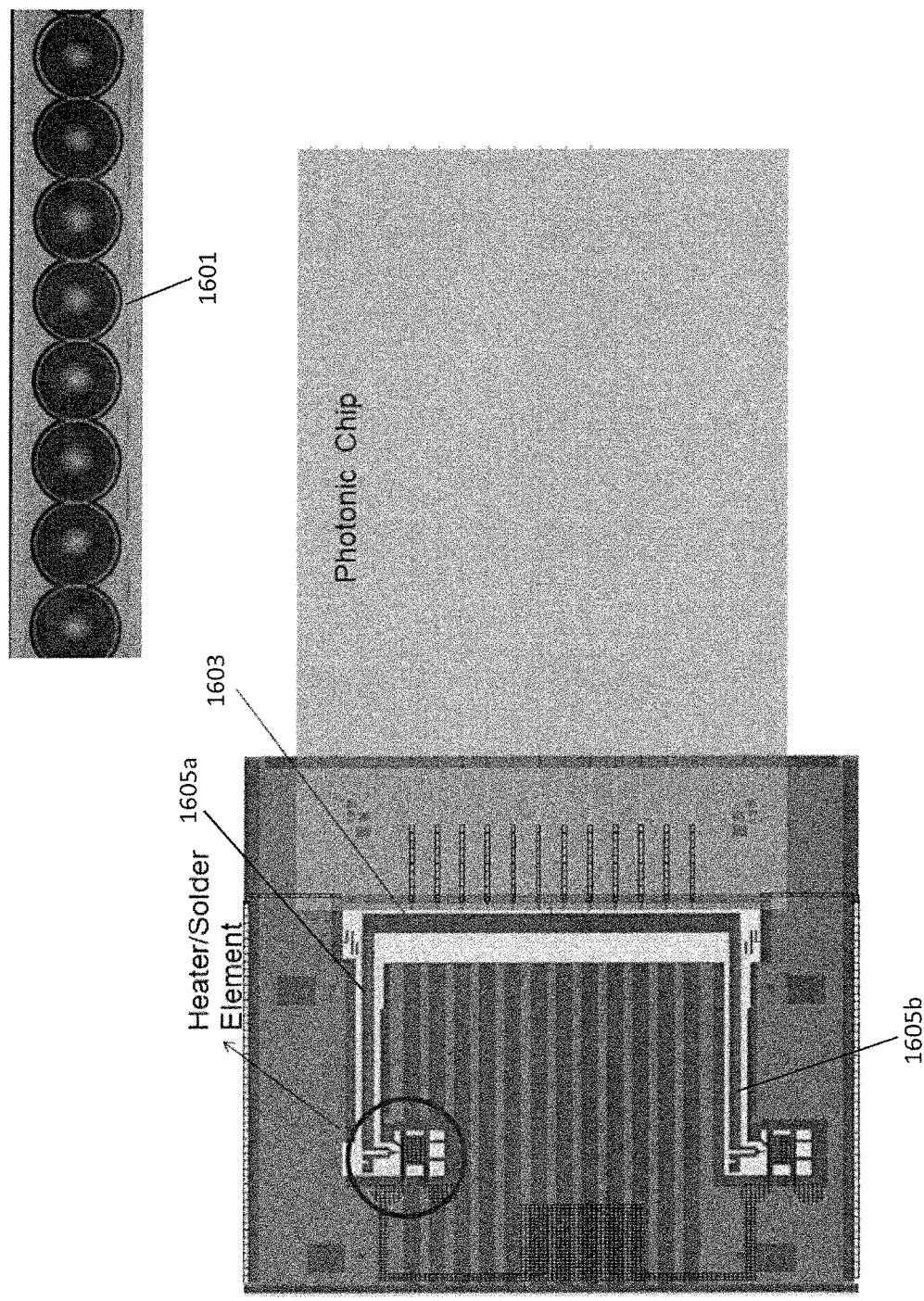
FIG. 16 illustrates a system that couples a Silicon Photonics chip to laser arrays using MEMS coupling in accordance with aspects of the invention.

Because many parts are made in array form, such as laser arrays, PLC, and Silicon Photonics chips, MEMS coupling may be used in an array configuration. This is shown in FIG. 16, and has been previously described in a patent, for example, U.S. Pat. No. 8,346,037 issued on Jan. 1, 2013 entitled MICROMECHANICALLY ALIGNED OPTICAL ASSEMBLY, the disclosures of which are incorporated herein by reference for all purposes.

FIG. 16 illustrates a system that couples a Silicon Photonics chip to laser arrays using MEMS coupling in accordance with aspects of the invention. In FIG. 16, an array of lenses 1601 may be made lithographically and attached to a movable stage 1603 that includes two adjustment arms 1605a,b, with one arm on each side. To align one array chip to another array chip using the array of lenses, the adjustment arms on the two sides of the array may be manipulated to optimize alignment and then lock in place.

Although the invention has been discussed with respect to various embodiments, it should be recognized that the invention comprises the novel and non-obvious claims supported by this disclosure.

What is claimed is:

1. An optical module for a switch, comprising:
   a plurality of chips with a plurality of light sources, configured to generate light, the light sources on a particular chip configured to generate light at about a common wavelength for that chip, with light sources on different chips configured to generate light at different wavelengths;
   a plurality of optical splitters, with each optical splitter having inputs and outputs and configured to split light generated by one of the plurality of chips; and
   a plurality of modulator arrays on a silicon photonics chip, with each of the plurality of modulator arrays including a plurality of modulators and configured to receive electrical signals from an electronics chip, to modulate light provided by one of the plurality of optical splitters based on at least a portion of the electrical signals, and to generate modulated optical signals;

a planar lightwave circuit (PLC) coupled to the silicon photonics chip and configured to combine the modulated optical signals from each of the plurality of modulator arrays into an optical signal.

2. The optical module of claim 1, wherein the plurality of optical splitters are on the silicon photonics chip.

3. The optical module of claim 1, wherein the plurality of chips configured to generate light are Indium Phosphide chips, and the plurality of optical splitters are on the Indium Phosphide chips.

4. The optical module of claim 1, wherein only one of the plurality of light sources from each of the plurality of chips is activated at a particular time.

5. The optical module of claim 1, wherein each of the plurality of chips comprises four lasers.

6. The optical module of claim 5, wherein the plurality of optical splitters comprise four optical splitters with each optical splitter comprising four inputs and four outputs.

7. The optical module of claim 6, wherein the plurality of modulator arrays comprise four modulator arrays with each modulator array comprising four modulators.

8. The optical module of claim 1, wherein the PLC comprises multiplexers, each of the multiplexers configured to multiplex the modulated optical signals from each of the plurality of modulator arrays and configured to generate the optical signal on a wavelength selective basis using the modulated optical signals.

9. The optical module of claim 1, wherein coupling of the silicon photonics chip to the plurality of chips is performed using MEMS coupling.

10. An optical module for a switch, comprising:

an InP chip including a plurality of light sources for providing light, a plurality of optical splitters having a plurality of inputs and outputs and for use in splitting the light provided by each of the plurality of light sources, and a plurality of modulators for modulating light received from the plurality of outputs of the plurality of optical splitters and for providing modulated optical signals, outputs of a switch IC chip coupled to the plurality of modulators for providing electrical signals for use in modulating the light received from the plurality of splitters to generate the modulated optical signals; and a planar lightwave circuit (PLC) optically coupled to the InP chip and positioned to receive and combine the modulated optical signals from the plurality of the modulators into an optical output.

11. The optical module of claim 10, wherein the plurality of light sources comprise lasers.

12. The optical module of claim 10, wherein the plurality of light sources comprise optical gain chips.

13. The optical module of claim 10, wherein each optical splitter is a 4×4 splitter having four inputs and four outputs.

14. The optical module of claim 10, wherein the PLC comprises a multiplexer for combining the modulated optical signals, the multiplexer having a plurality of inputs and an output, the multiplexer configured to produce the optical output on a wavelength selective basis using the modulated optical signals.

15. The optical module of claim 10, wherein the plurality of light sources comprise four lasers, the plurality of modulators comprise four modulators, and the optical output is produced on a wavelength selective basis based on four wavelengths.

16. The optical module of claim 10, wherein the plurality of modulators comprise Mach-Zehnder modulators.

* * * * *